May 17, 1960   D. A. MAZZARELLA ET AL   2,937,354
THERMALLY-SENSITIVE RESISTOR
Filed Aug. 2, 1957
FIG. 1.   FIG. 1A.
EXTRUDED AND DRIED THERMISTOR STOCK
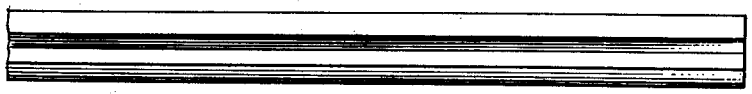 
FIG. 2.
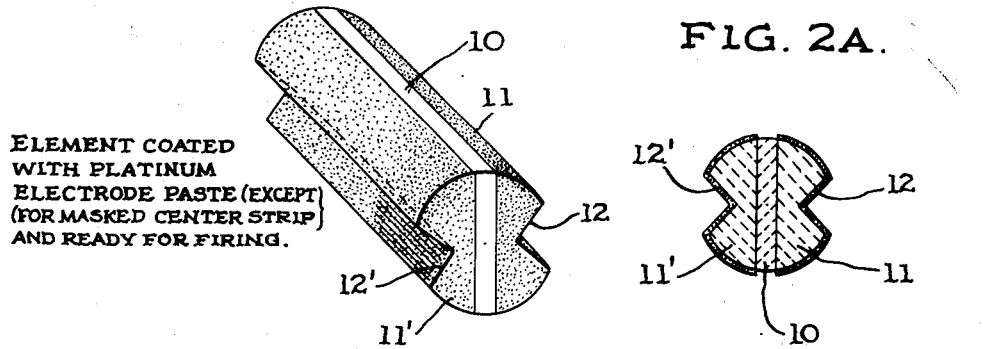
ELEMENT COATED WITH PLATINUM ELECTRODE PASTE (EXCEPT FOR MASKED CENTER STRIP) AND READY FOR FIRING.
FIG. 2A.
FIG. 3.
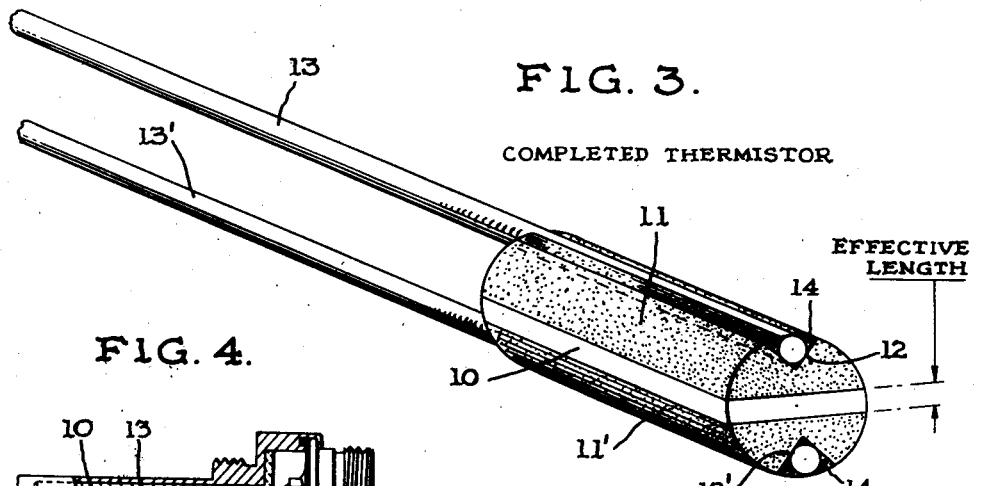
COMPLETED THERMISTOR
FIG. 4.
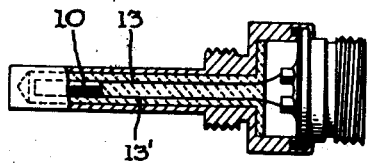
INVENTORS
WALTER J. TARNACKI
DANIEL A. MAZZARELLA
BY K. G. Doub
ATTORNEY

United States Patent Office 2,937,354
Patented May 17, 1960

2,937,354

THERMALLY-SENSITIVE RESISTOR

Daniel A. Mazzarella and Walter J. Tarnacki, Baltimore, Md., assignors to Bendix Aviation Corporation, Baltimore, Md., a corporation of Delaware Application August 2, 1957, Serial No. 676,011

2 Claims. (Cl. 338—22)

This invention relates to thermally-sensitive electrical resistors, commonly known as thermistors, and the principal objects are:

(1) To provide a low-resistance thermistor having good stability and a relatively rapid response at extremely low temperatures, for example temperatures of −400° F. and lower, and which at the same time may be made relatively small in size and provided with leads for convenient installation in probes, electronic circuitry and the like, where space is at a premium. An example of "relatively small size" would be a thermistor having the over-all size of the conventional half-watt composition resistor.

(2) To provide a method of manufacturing a thermistor having the characteristics specified in (1) which permits production in quantity at a cost commensurate with various commercial applications or installations.

(3) To provide a thermistor as in (1) which adapts itself either for encapsulation, as in a probe shell or cartridge, or for use unencapsulated, and which in either case may be readily wired in an electric circuit.

Other objects and advantages will become apparent in the light of the following descriptive matter taken in conjunction with the drawing, wherein:

Figs. 1 and 1A are greatly enlarged views in side and end elevation, respectively, of an extruded length of ceramic stock, from which the individual thermistors of the invention are made;

Figs. 2 and 2A are views in perspective and cross section, respectively, of one of the thermistor elements which has been cut from the dried stock of Fig. 1 and its electrode portions given a conductive coating ready for the firing or heat-treating operation;

Fig. 3 is a perspective view of the finished thermistor with leads attached thereto; and Fig. 4 illustrates how the improved thermistor may be conveniently installed in a probe cartridge.

To understand the problems here involved, it should be borne in mind that heretofore, as far as known, rod-shaped thermistors having a resistance value as low as 25 ohms at normal room temperature required a diameter of approximately .24 inch and an over-all length of approximately one-half inch, using a composition heat-treated to obtain the lowest specific resistance value. Since response to changes in temperature is inversely proportional to mass, the larger the bulk or mass of material involved, the slower the response. Thus thermistors having the dimensions above noted are not only too slow in responding to changes in temperature for certain requirements but they are too large for installations where space is at a premium. Since $$R = \frac{\epsilon L}{A}$$

where R is resistance of thermistor at normal room temperature, $\epsilon$ the specific resistance, L the shortest distance between electrodes or the effective length of the resistance path, and A the cross-sectional area of the thermistor between electrodes, to arrive at a small thermistor of the size above indicated by way of example and assuming it is desired to have a low R for low-temperature measurement, and further assuming the value of $\epsilon$ has already been brought to its lowest point during processing of the thermistor stock or body, then the effective length (L) must be reduced and/or the area (A) increased. However, as these parameters are varied, the problem of attaching leads to the extremely delicate partly-processed thermistor slug in a manner to obtain good conductivity becomes more acute, particularly in cases where the thermistor is to be inserted in a protective probe cartridge or the like. These problems have been effectively solved by utilizing a thermistor such as that shown and described herein.

Referring first to Fig. 3, the ceramic body 10 of the thermistor is comprised of oxidic semi-conducting materials (an example of which is given below), having a short rod-like shape. Typical dimensions of a production type are ⅜ inch in over-all length, .140 inch in diameter and an effective length (between electrodes) of less than 1/32 inch. The "A" in the above formula would be the surface area of a rectangular sheet of thermistor material less than 1/32 inch thick, about .140 inch wide and ⅜ inch long. The entire side and end surfaces of the thermistor on opposite sides of the central area 10 are coated with a conductive material, and these constitute the electrodes, indicated at 11 and 11'. Extending longitudinally the entire length of the thermistor on both sides thereof and substantially centrally of the electrodes 11, 11' are grooves 12, 12', and leads 13, 13' are located in these grooves and embedded in solder or like material 14 having good electrical conducting properties and capable of bonding to the electrode material and the material of the leads.

A description of the preferred method of making the finished thermistor of Fig. 3 follows:

The specific types and proportions of metallic oxides used in making the thermistor body may vary within limits, depending upon the end characteristics desired, or the specifications which the thermistor is designed to meet. A typical mix may comprises: ferric oxide, 80% by weight; titanium oxide, 1.5%; zirconium oxide, 2.5%; bentonite, 3.0% and ball clay, 13.0%. These components are mixed while in a dry finely-divided or powdery state, then ball-milled with distilled water to form a slurry having a pH value between 5.0 and 7.0, which is press-filtered and pug-milled to proper extrusion consistency.

The pugged clay mixture is extruded onto a conveyor through an extrusion die contoured to produce a continuous length of thermistor stock, generally rod-shaped in cross section, and having a pair of lead grooves 12, 12' at diametrically opposite sides thereof, note Figs. 1 and 1A. The conveyor passes through a drying oven maintained at a temperature of about 350° F., during which period the thermistor stock is dried to a self-sustaining degree of hardness, whereupon it is severed into individual lengths or elements having the dimensions of the finished thermistor.

The individual elements are next coated with a suitable electrode material. Platinum paste is preferred since its coefficient of expansion corresponds more nearly to that of the element than copper and other known electrode coatings; also its melting point is above that of the heat-treating temperatures of the ceramic body composition. Coating may be effected by dipping in a platinum paste bath, being careful to mask the "effective length" surface area between the electrodes. Other conductive coatings may be used; they usually consist of powdered metal suspended in a temporary binder, which evaporates at a given temperature, leaving a smooth, even metallic coating.

The coated elements are then fired or heat-treated in a kiln for approximately two hours at a temperature of about 2300° F., removed when at a temperature of 1350° F. and quenched. This treatment imparts the required low specific resistance to the element.

To apply the leads, the heat-treated elements are heated to the melting point of the type of solder to be used. For lead flux or soft solder, the element should be heated to about 400° F.; for silver solder, to about 1200° F. The leads 13, 13' are then placed in the grooves 12, 12' and the solder applied, whereupon it melts and flows evenly around the leads, embedding the latter in the grooves and effectively bonding the leads to the platinum electrode coating, which covers the entire surface area of the element except the effective length area between the electrodes.

A thermistor configured and processed as disclosed herein exhibits practical resistance values at extremely low temperatures, for example temperatures in the range of liquid helium, liquid oxygen and other liquid gases. Thermistors have been calibrated down to below −400° F. This is rendered possible by the relatively great reduction in the effective length of the thermistor while at the same time maintaining a relatively large surface area between electrodes and a small over-all mass of oxidic semi-conductive material in the entire thermistor. Despite the small size of the element, the wire leads are firmly bonded to the electrodes and through the latter to the ceramic body; and since they do not project beyond the surface of the body and both extend in the same direction, the thermistor may be readily installed in a probe cartridge or shell as indicated in Fig. 4. In this instance a potting compound is used to hold the thermistor fixed in its tubular probe shell. Due to the fact that the leads do not project beyond the thermistor body, the latter may be located closer to the tube wall, thereby expediting its response to temperature changes. This firm and rugged method of attaching leads assumes added importance when the thermistor is subjected to thermal shock conditions as is often the case in various types of low-temperature installations where the temperature may vary over a range of from three to four hundred degrees Fahrenheit in a relatively short time.

What is claimed is:

1. A thermally-sensitive resistor comprising an elongated, generally rod-shaped body of oxidic semi-conducting material having a pair of conductor-receiving grooves formed in substantially diametrically opposite sides and extending for substantially the full length thereof, a coating of electrode material covering substantially the entire surface area of said sides and grooves except for a diametrically short uncoated surface area which constitutes the resistance path or "effective length" of the resistor, said "effective length" being materially shorter than the diametric distance between the bottoms of the grooves which receive the leads, and a pair of conductors imbedded in said grooves and bonded to said electrode material.

2. A thermally-sensitive resistor as claimed in claim 1 wherein said conductors extend in the same direction from said body to facilitate the use of the resistor as a probe.

References Cited in the file of this patent

UNITED STATES PATENTS

| 2,219,365 | Janssen | Oct. 29, 1940 |
| 2,358,211 | Christensen et al. | Sept. 12, 1944 |
| 2,694,050 | Loman | Mar. 9, 1954 |
| 2,700,720 | Torok | Jan. 25, 1955 |
| 2,863,034 | Tassara | Dec. 2, 1958 |

FOREIGN PATENTS

| 1,133,868 | France | Apr. 3, 1957 |